Aug. 9, 1966  K. NICHOLS  3,264,882
GYROSCOPE

Filed Dec. 17, 1962  2 Sheets-Sheet 1

INVENTOR.
KOYTT NICHOLS
BY
John H. Widdowson
ATTORNEY

INVENTOR.
KOYTT NICHOLS
BY John H. Widdowson
ATTORNEY

United States Patent Office 3,264,882
Patented August 9, 1966

3,264,882
GYROSCOPE
Koytt Nichols, 2255 N. Roosevelt, Wichita, Kans.
Filed Dec. 17, 1962, Ser. No. 245,009
5 Claims. (Cl. 74—5.7)

This invention relates to a gyroscope. In a more specific aspect, the invention relates to a gyroscope construction wherein the rotor member is rotatably mounted in a substantially frictionless manner. In a more specific aspect, the invention relates to means for mounting a rotor in a gyroscope or the like wherein relatively large balls are sealingly mounted in end portions of a rotor shaft and bearingly engage a plurality of balls in ball bearings with a major portion of the balls on the rotor shaft projecting therefrom to provide a relatively large surface contact area for the balls and the ball bearing. In another aspect, the invention relates to a new gyroscope construction wherein shaping and hardening of the rotor shaft previously required have been eliminated, resulting in reduced production costs and less friction and load on the rotor shaft. In addition, the invention relates to rotor shaft constructions and mountings wherein the force is taken off the rotor shaft and only axially loading is present.

Various types of gyroscope constructions are known to the art. Many attempts have been made to mount the rotor in a substantially frictionless manner, and this is frequently done by shaping the end portions of the rotor shaft into a conical or frusto-conical shape and hardening same to provide a race for rotation of balls in ball bearings placed in engagement with and supporting the rotor shaft. This rotor shaft mounting is not satisfactory because it is expensive to shape and harden the rotor shaft and excessive wear often results on operation. In addition, when the hardened and tapered surface of the rotor shaft becomes damaged in use, it is necessary to replace the entire rotor shaft and in some instances the entire rotor assembly, thereby making repairs expensive. In other instances, attempts have been made to mount a ball in each end portion of the rotor shaft to bearingly engage ball bearings or the like, however such is not entirely satisfactory since the ball on the rotor shaft must be inserted more than 50 percent of the way into a hole in the end of the shaft in order for the ball to be held in place and it is difficult, if not impossible, to remove the ball. In some constructions radially extending holes or openings have been provided on the rotor shaft intersecting the recess holding the balls and through which tools are inserted to force the ball outwardly from its mounting for replacement, however, such weakens the rotor shaft and if not properly formed can unbalance the shaft, making operation unsatisfactory. Other attempts have been made to mount and remove a ball on the end of a rotor shaft by making the rotor shaft in two pieces and mounting same on the rotor with an axially extending hole through each of the portions of the rotor shaft so that the ball can be disengaged from its mounting by passing a tool through the holes from the inner end thereof after removal from the rotor. Also, where the balls are mounted on the ends of the rotor shaft it is normally necessary for the ends or portion of the shaft around the ball to be sprung or bent inwardly to tightly grip the ball making frequent removal repair of the rotor shaft by removal of the ball unsatisfactory and further substantially reducing the portion of the ball available for contact by the supporting ball bearings in engagement therewith during operation. In addition many of the rotor shaft constructions and mountings result in a load in a substantially radial direction on the rotor shaft which is undesirable.

In accordance with the present invention, a new and improved gyroscope construction is provided which overcomes the disadvantages of the prior art construction and results in a substantially improved gyroscope and rotor mounting therefor which costs less to produce and use than many prior art structures and eliminates load and wear problems resulting therefrom. The gyroscope and rotor mounting of the invention includes a rotor shaft which has an intermediate portion connectible to a rotor for rotation therewith with end portions of the rotor shaft having recesses therein. Two balls are provided and are positioned in the recesses in the end of the rotor shaft, preferably by fluid seals resulting by pressing the balls in the only opening of the recesses and desirably a major portion of the balls project from the openings or recesses. Means are provided to support ball bearings which are positioned to engage the surface of said balls in said rotor shaft to thereby substantially frictionlessly and rotatably mount the rotor shaft and rotor for rotation within a gimbal ring and vertical ring.

Accordingly, it is an object of the invention to provide a new gyroscope construction.

Another object of the invention is to provide a new gyroscope construction having new and improved means for mounting the rotor shaft and rotor to permit substantially frictionless rotation thereof.

A further object of the invention is to provide a new gyroscope construction having a rotor therein which has balls sealingly mounted in the ends thereof with a major portion of the balls projecting from the rotor shaft.

Another object of the invention is to provide a new gyroscope construction wherein shaping and hardening of the outer surface of the ends of the rotor shaft has been eliminated.

Another object of the invention is to provide a new gyroscope construction having a rotor shaft with balls mounted in the ends thereof and having a major portion projecting from the rotor shaft with the balls being sealed in position and wherein holes or openings required by prior art constructions for removal of the balls in the rotor shaft have been eliminated.

Another object of the invention is to provide a new rotor shaft mounting including balls in the end of the rotor shaft which is less expensive to manufacture and assemble than prior art structures and which is easier to repair and replace parts.

Various other objects, advantages and features of the invention will become apparent from the following description taken in connection with the accompanying drawings, in which.

The following is a discussion and description of a preferred specific embodiment of the new gyroscope of the invention, such being made with reference to the drawings whereon the same reference numerals are used to indicate the same or similar parts and/or structure.

Figure 1:
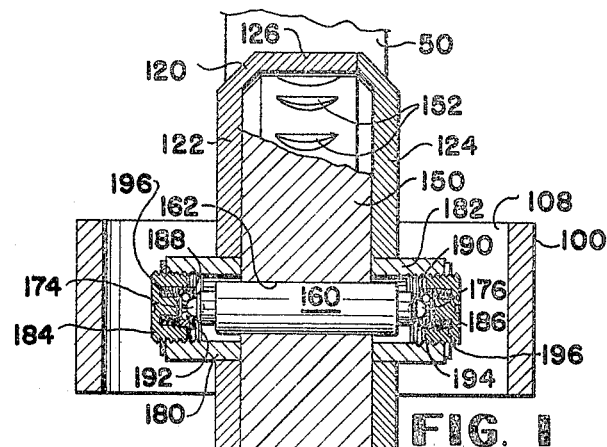
FIG. 1 is a cross section view showing a gyroscope rotor and mounting thereof taken along the line 1—1 of FIG. 2.

It is to be understood that such discussion and description is not to unduly limit the scope of the invention.

Referring now to the drawings, in detail, the gyroscope of the invention is shown generally at 10 and includes a housing 12 having a top 14, a bottom 16, two sides 18 and 20 and two ends 22 and 24 which together define a hollow and generally cubical space. A window 26 is preferably provided in the side 18 of the housing and is desirably of glass or other suitable transparent material.

Figure 2:
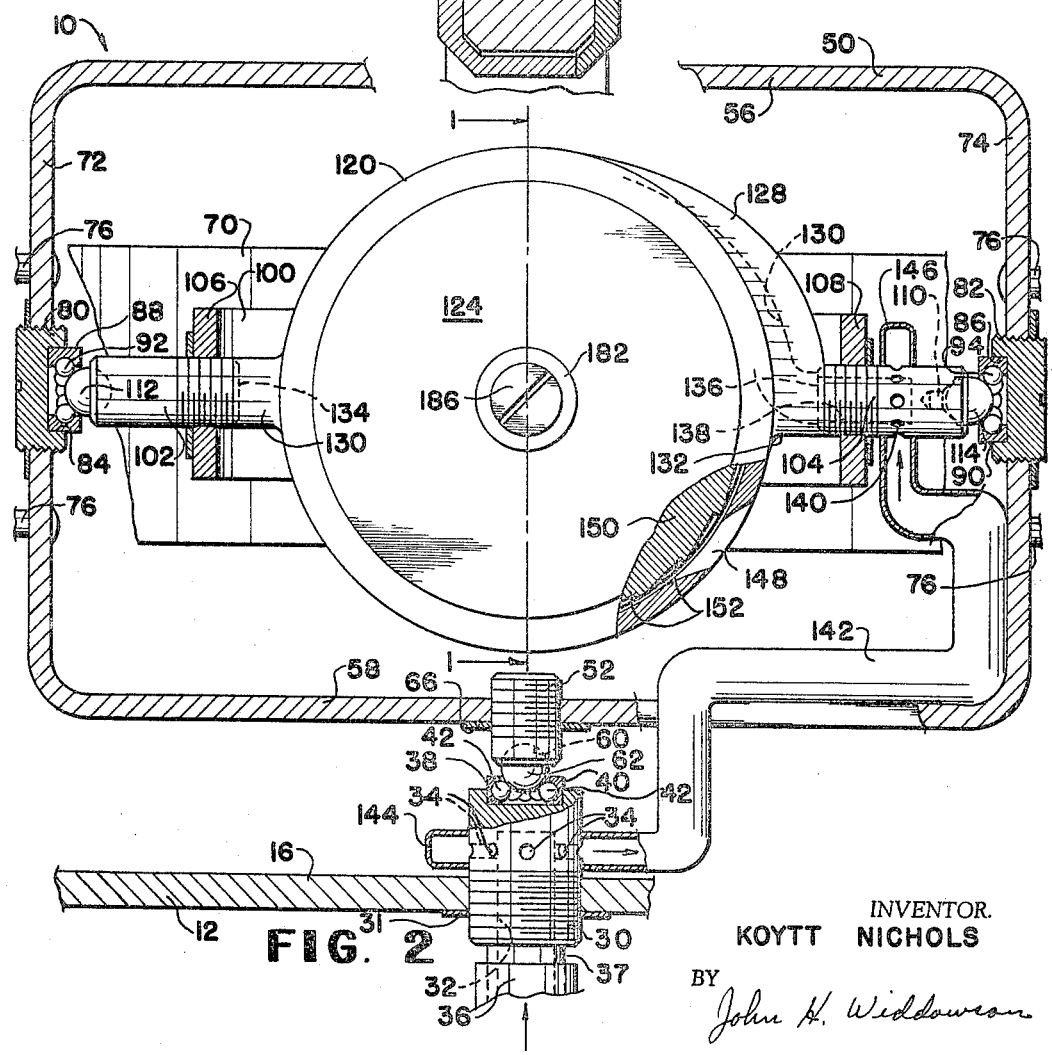
FIG. 2 is an enlarged view, partially in cross section and partially broken away, showing a preferred specific embodiment of the gyroscope of the invention.
Figure 3:
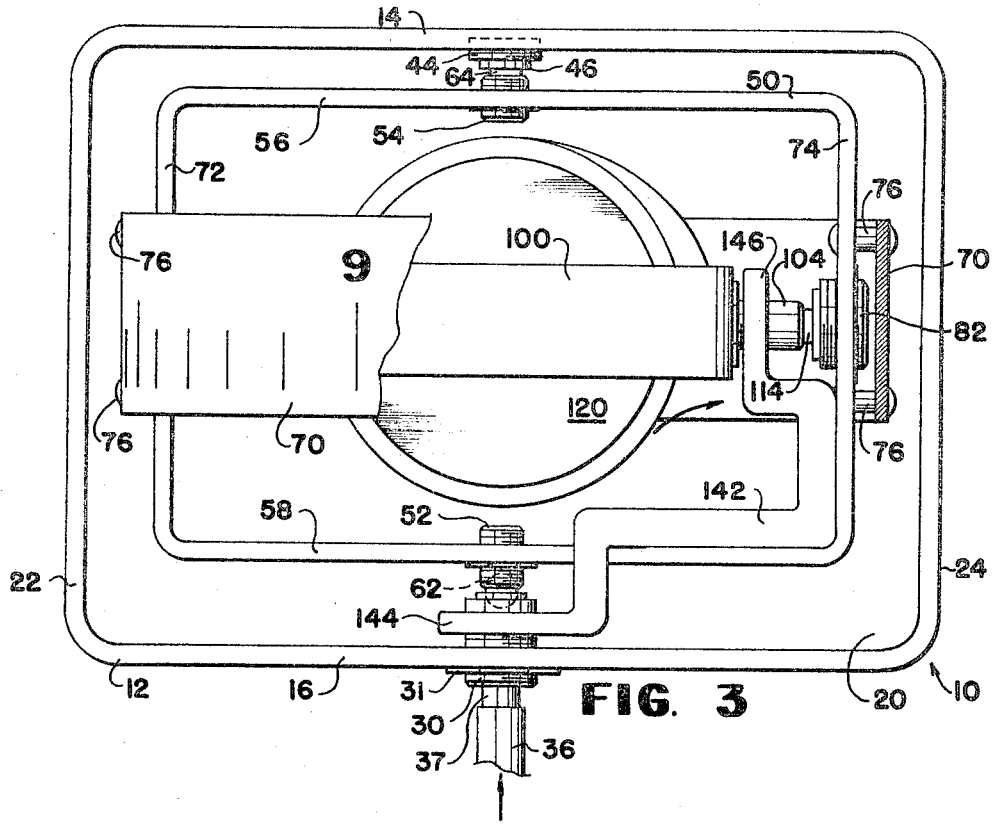
FIG. 3 is a view on a reduced scale through a gyroscope housing and showing the elements of the gyroscope therein.

An elongated generally cylindrical air inlet member 30 is threadedly mounted in the bottom 16 of the housing and a portion thereof is positioned outside the housing and another portion is positioned inside the housing as illustrated in FIGS. 2 and 3. Lock washer 31 can be used to hold air inlet member 30 in the desired position. The air inlet member 30 has a cylindrical opening 32 therein which extends axially therealong from the axially outer end portion to an intermediate portion thereof as shown in FIG. 2 and a plurality of spaced and preferably radially extending holes 34 are provided and positioned within the housing and communicate with the opening 32. A tube or conduit 36 is provided and is operatively connected in one end portion to the outer end portion of the air inlet member 30 by coupling member 37 and tube 36 is connectible in the other end portion to a source of air or other gas under pressure for driving the rotor in the manner explained hereinafter.

The inner end portion of the air inlet member 30 is preferably provided with a shallow and generally cylindrical recess 38 which receives a ball bearing 40 having balls 42 and bearing 40 desirably of the combination radial and thrust type.

A vertical ring bearing support 44, FIG. 3, is provided and mounted in the top 14 of the housing 12 and preferably has a cylindrical recess therein similar to that shown at 38 for the air inlet member 30 which receives and mounts a common ball bearing 46 which is also desirably of the combination radial and thrust type having a plurality of balls therein. Bearing 46 can be the same or similar in construction to bearing 40.

An open and preferably generally rectangular vertical ring 50 is positioned in housing 12 and is mounted to be movable about an axis from the top 14 to the bottom 16 of the housing passing through the air inlet member 30 and the vertical ring bearing support member 44. This mounting is preferably obtained by use of two elongated ball mounting members 52 and 54 of like construction which are preferably generally cylindrical and are threadedly mounted in opposed relation in opposite side portions 56 and 58 of the vertical ring 50. The ball mounting members 52 and 54 each preferably have a recess in one end portion thereof as shown at 60 for the members 52 in FIG. 2 which are of size and shape to receive and hold two spherical balls 62 and 64. If desired, lock washers as shown at 66 in FIG. 2 can be used with the mounting members 52 and 54 to hold same in the desired location in the vertical ring 50. The ball mounting members are adjustable in ring 50 to position the balls 62 and 64 in contact with the spherical balls of the bearings 40 and 46 and thereby movably mount the vertical ring in the housing with the ring being movable about an axis through the balls 62 and 64. Preferably, the balls 62 and 64 have a major portion thereof projecting from the mounting members and are sealingly mounted in position therein. This mounting can be accomplished in the manner described hereinafter in connection with the mounting of the rotor shaft.

Figure 5:
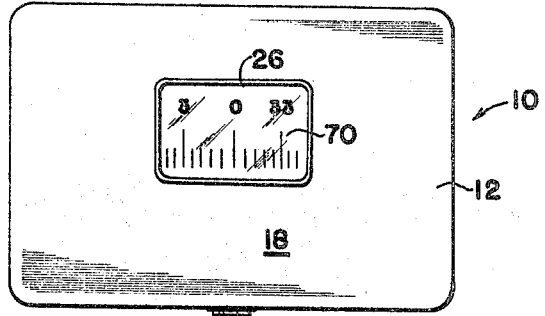
FIG. 5 is a plan view of a gyroscope housing or case with the dial or gauge being viewable through the window therein.

A circular dial 70 is preferably provided and connected to side portions 72 and 74 of the vertical ring 50 by use of studs or rivets 76. The dial 70 desirably has indicia on the outer surface thereof as best shown in FIGS. 3 and 5 and is positioned in a plane substantially perpendicular to the axis of rotation of the vertical ring 50 and is positioned to be viewable through the window 26 in housing 12.

Two generally cylindrical gimbal ring mounting members 80 and 82 are threadedly and adjustably mounted in side portions 72 and 74 of the vertical ring 50 and each has a cylindrical recess therein facing each other when mounted as shown at 84 and 86, respectively. Two ball bearings 88 and 90 are positioned in and mounted in the recesses 84 and 86, respectively, and the bearings 88 and 90 include spherical balls 92 and 94, respectively. Bearings 88 and 90 are preferably of the combination radial and thrust type and can be of any suitable construction.

A generally rectangular gimbal ring 100 is provided and positioned within the housing 12 and vertical ring 50 and normally located in a plane which is substantially perpendicular to the axis of the vertical ring with the axis of movement of the gimbal ring being substantially perpendicular to the axis of the vertical ring. Two elongated and generally cylindrical gimbal ring supports 102 and 104 are threadedly and adjustably mounted in opposite sides 106 and 108 of the gimbal ring 100 and the supports 102 and 104 each have a recess therein as shown at 110 for the support 104. Two spherical balls 112 and 114 are received by the recesses in the ends of the members 102 and 104 and project therefrom and are positioned in bearing engagement with the balls 92 and 94 of the bearings 88 and 90. Preferably, the balls 112 and 114 are sealingly mounted in the recesses in the manner described hereinafter in connection with the mounting of the balls in the rotor shaft.

A rotor case is provided and is shown generally at 120 and preferably includes two spaced sides 122 and 124 and a generally annular end wall 126 which is shown in the drawings as being integrally formed with the side wall 122. The upper edge portions of the side walls 122 and 124 can be beveled or inclined as shown in FIG. 1, if desired. The rotor case 120 has a substantially cylindrical space defined by the side walls 122 and 124 and the end wall 126. End wall 126 is preferably provided with an enlarged portion as shown at 128 in FIG. 2 which has an arcuate recess 130 therein which merges at its innermost portion with the hollow or space defined by the rotor case and is substantially tangent thereto at its inner end portion. Two projecting abutments 130 and 132 are provided on the rotor case 120 and the arcuate recess 130 extends through the abutment 132. The abutments 130 and 132 are at substantially diametrically opposite portions of the case 120 and each have a shallow recess therein as shown at 134 and 136 at the outermost ends thereof to matingly receive the inner end portions of the gimbal ring mounting members 102 and 104, respectively, and thereby removably mount the rotor case 120 in position on the mounting members.

Preferably, the gimbal ring mounting member 104 has an axially extending cylindrical hole or opening 138 which extends from the innermost end portion thereof to an intermediate portion thereof and is intersected by a plurality of radially extending holes or openings 140 which extend from the outer surface of the mounting member to the hole or opening 138. An air conduit or tube 142 is provided and has one end portion 144 thereof sealingly positioned around and in fluid communication with the holes 34 in the air inlet member 30 with the other end portion 146 of the tube or conduit 142 positioned around the gimbal ring mounting member 104 and positioned in fluid communication with the holes or openings 140 thereof or therein. Air or other suitable fluids under pressure can thus be provided to the rotor case 120 through the air tube 36, through the opening 32 and holes 34 in air inlet member 30 into the tube or conduit 142, through the holes or openings 140 and 138 in the gimbal ring mounting member 104 into the arcuate recess 130 in the rotor case with air passing into the rotor case in a substantially tangential manner. A hole or opening 148 is provided in the rotor case adjacent the recess 130 to pass air from the rotor case.

A generally cylindrical rotor 150 is positioned within the rotor case 120 and substantially fills the hollow thereof and preferably the rotor 150 has a plurality of substantially equally spaced recesses 152 therein which are shaped and of size to receive air from the recess 130 in the rotor case to cause rotation of the rotor.

Figure 4:
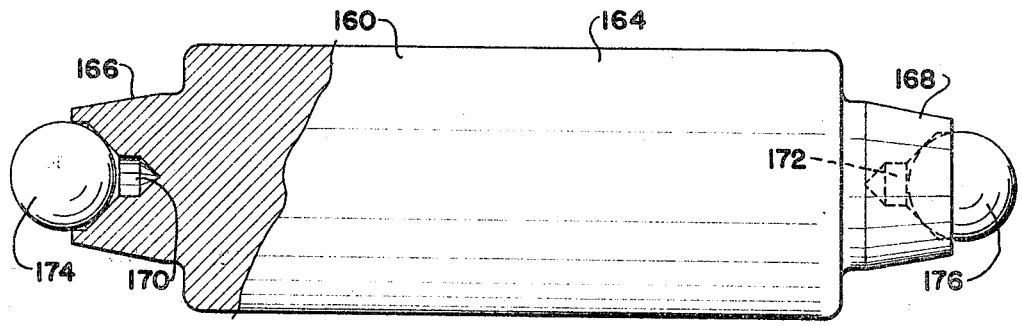
FIG. 4 is an enlarged view of a preferred construction of the rotor shaft with one end portion of the rotor shaft being shown in cross section to illustrate the construction thereof.

An elongated, solid rotor shaft 160 is provided as shown in FIGS. 1 and 4 and desirably coaxially passes through a hole or opening 162 in the rotor 150. Rotor shaft 160 is secured to the rotor in any suitable manner for rotation therewith and the rotor shaft preferably has an elongated cylindrical center or intermediate portion 164 and end portions 166 and 168 which are smaller in diameter than the center portion 164. End portions 166 and 168 of shaft 160 desirably have recesses 170 and 172, respectively, therein which open to the ends of the shaft and which extend axially along the shaft as illustrated in FIG. 4.

Two spherical, hard balls 174 and 176 are removably mounted in the recesses 170 and 172 respectively. As best illustrated in FIG. 4, the balls 174 and 176 preferably have a major portion or more than half of the ball projecting from the recesses and are thus easily removed for replacement since the ball can be easily grasped by a tool. Preferably the balls 174 and 176 are mounted in place by a fluid seal. This can be accomplished by placing oil or other suitable fluids in the recesses 170 and 172 and then pressing the ball tightly in place therein which drives air out of the recess and the ball is then held in place by surface tension between the ball and the oil or the like in the recesses. The recesses 170 and 172 are desirably shaped and of size so that the balls are in contact with the inner walls of the recesses when mounted in place. Also, an air seal can be effected in substantially the same way and in the case of air or other gases, the ball is held in place by a partial vacuum created behind the ball as a result of pressing the ball very tightly into the recess and then permitting the ball to move axially outwardly in the recess a slight distance. In order to effect this mounting, the outermost end portions of the rotor shaft 160 are preferably relatively thin walled to permit a small amount of expansion in a radial direction during mounting of the balls. This ball mounting is an important feature of the invention and provides a larger surface area of the balls for contact by mounting means for the rotor shaft for any given diameter of ball. Furthermore this mounting eliminates the need of many prior art gyroscopes of forming radially extending holes through the rotor shaft to provide means for ejecting the balls from the recesses or of making the rotor shaft in two parts with axial extending holes therethrough so that a tool can be inserted to eject the balls. Thus, a solid rotor shaft 160 can be used and problems of breakage or alignment or balance have been eliminated. This preferred mounting for the balls 174 and 176 can also be used in mounting the balls 62, 64, 112 and 114 which pivotally mount the vertical ring and gimbal ring.

Two cylindrical rotor shaft supports 180 and 182 are provided and are secured to and project from the sides 122 and 124 of the rotor case and the rotor shaft supports are desirably coaxial with the rotor shaft 160 when mounted in the rotor 150 and positioned in the rotor case 120. Two rotor shaft mounting members 184 and 186 are threadedly and adjustably mounted in the outer end portions of the rotor shaft supports 180 and 182, respectively, and each have a generally cylindrical recess on the inner surface thereof as shown at 188 and 190, respectively. Ball bearings 192 and 194 are mounted in recesses 188 and 190, respectively, and the ball bearings can be of any suitable and common construction having a plurality of spherical balls therein and are preferably of a common radial and thrust combination type bearing. The balls 174 and 176 are placed in engagement with the spherical balls of the bearings 192 and 194 by adjusting the members 184 and 186 radially inwardly toward the rotor shaft and the balls of the bearings 192 and 194 are each in point contact with the balls 174 and 176 to provide a substantially frictionless mounting for the rotor shaft 160. Axial loading of the rotor shaft 160 is preferably obtained by use of a plurality of helical springs 196 positioned in recesses in the rotor shaft mounting member 184 and 186 which engage the races of the bearings 192 and 194 to urge the bearings toward the rotor shaft 160 and thereby maintain a firm and constant contact between the balls of the bearings 192 and 194 and the balls 174 and 176 on the rotor shaft. As will be apparent from the description of the rotor shaft and mounting thereof, no radial load is on the rotor shaft itself which is quite desirable and eliminates wear occurring on the rotor shaft in many prior art constructions, particularly where the rotor shaft is tapered and hardened on the end portions and received by a ball bearing which is tightly pressed thereon to support the rotor shaft in use.

The gyroscope 10 of the invention is preferably used for a directional gyroscope indicator or a gyroscope horizon indicator. In use the rotor 150 of the gyroscope is rotated by air or other suitable fluids provided to the rotor case 120 by fluid received from the tube 36 and passing through the air inlet member 30, tube or conduit 142 gimbal mounting member 104 and recess or opening 130 into the rotor case 120 with the fluid engaging the recesses 152 in the rotor 150 to facilitate rotation of the rotor 150. The mouning of the rotor shaft 160 is such that substantially frictionless rotation of the rotor is provided during operation thereof and should any wear occur on the balls 174 and 176 of the rotor shaft due to engagement with the balls of the bearings 192 and 194, then the balls 174 and 176 are easily removed due to the fact that a major portion of the balls project from the ends of the rotor shaft. The fluid seal obtained by the recesses 170 and 172 and by pressing the balls 174 and 176 thereinto has been found suitable and desirable in operation and this rotor shaft mounting also reduces production costs since hardening and accurate shaping of the outer surface of the end portions of the rotor shaft previously required has been eliminated.

While the invention has been described in connection with a preferred specific embodiment thereof, it will be understood by those skilled in the art that such is intended to illustrate and not to limit the scope of the invention which is defined by the claims.

I claim:

1. An instrument gyroscope comprising, in combination, a housing having a top, a bottom, two sides and two ends defining a hollow space, a window in one of said sides, an elongated air inlet member threadedly mounted in said bottom of said housing with a portion of said air inlet member being outside said housing and with another portion thereof being inside said housing, said air inlet member having a cylindrical opening therein extending axially therealong from the axially outer end thereof to an intermediate portion thereof and having a plurality of spaced and radially extending holes therethrough positioned within said housing and communicating with said opening, an air tube connected in one end to said outer end of said air inlet member and connectible in the other end to a source of air under pressure, the other end of said air inlet member having a shallow cylindrical recess therein, a first ball bearing positioned in said recess and having a plurality of spherical balls rotatably mounted therein, a vertical ring bearing support mounted in said top of said housing and having a cylindrical recess in the innermost portion thereof opening into said housing and positioned in opposed relation to said recess in said air inlet member, a second ball bearing mounted in said recess in said bearing support and having a plurality of spherical balls rotatably mounted therein, an open and generally rectangular vertical ring positioned in said housing, two elongated ball mounting members of like construction threadedly mounted in opposed relation in opposite side portions of said vertical ring, each of said ball mounting members having a recess in one end thereof facing outwardly from said ring, two spherical balls, each of said recesses in said ball mounting members having one of said balls mounted therein with said balls projecting therefrom and with said ball mounting members being adjustable in said ring to position said balls in contact with said spherical balls in said first and second ball bearings to thereby movably mount said vertical ring in said housing, each of said balls having a major portion thereof projecting from said mounting members and sealed in position therein, a circular dial member having indicia on the outer surface thereof, said dial member surrounding and secured to said vertical ring in a plane substantially perpendicular to the axis of rotation of said vertical ring and positioned to be viewable through said window, two gimbal ring mounting members threadedly and adjustably mounted in the other side portions of said vertical ring, each of said gimbal ring mounting members having a cylindrical recess therein opening toward each other, third and fourth ball bearings mounting in said recesses in said gimbal ring mounting members each having a plurality of spherical balls rotatably mounted therein, a generally rectangular gimbal ring positioned within said vertical ring normally located in a plane substantially perpendicular to the plane of said vertical ring, two elongated gimbal ring supports threadedly and adjustably mounted in opposite sides of said gimbal ring, each of said gimbal ring supports having a recess in the outer end portion thereof, two spherical balls, said last-named balls being sealingly mounted in said recesses in said gimbal ring supports and projecting therefrom and bearingly engaging said balls of third and fourth bearings with a major portion of said last-named balls projecting from said supports, a rotor case having two spaced side walls and a generally annular end wall extending between and secured to the outer end portions of said side walls to define a substantially cylindrical space in said rotor case, said end wall having two projecting abutments thereon at substantially diametrically opposite positions on said case each having a recess in the outer portion thereof matingly receiving the inner end portions of said gimbal ring supports to thereby mount said rotor case on said mounting members, one of said gimbal ring supports having an axially extending hole therein extending from said inner end thereof to an intermediate portion thereof and being intersected by a plurality of radially extending holes from the outer surface of said ring support to said hole, an air conduit having enlarged annular end portions with one end portion thereof sealingly surrounding and in fluid communication with said soles in said gimbal ring support and having the other end portion thereof positioned around and in fluid communication with said holes in said air inlet member, said rotor case having a recess therein extending into one of said abutments positioned in fluid communication with said hole in said inner end portion of said one of said gimbal ring supports and extending arcuately therefrom around a portion of said rotor case with the surface thereof smoothly merging in a tangential manner with the inner surface of said end wall of said case, to pass air into said case, a generally cylindrical rotor positioned within said rotor case and substantially filling the hollow thereof with said rotor having a plurality of equally spaced recesses therein on the radially outer surface thereof with said recesses being engageable by air or the like provided to said rotor case through said air conduit, said gimbal ring support and said recess in said rotor case, a solid rotor shaft coaxially passing through said rotor and secured thereto for rotation therewith, said rotor shaft having an elongated cylindrical center portion and end portions smaller in diameter than said center portion, two cylindrical rotor shaft supports secured to and projecting from opposite sides of said rotor case with said rotor shaft supports being coaxial with said rotor shaft and receiving said end portions of said rotor shaft, two rotor shaft mounting members threadedly mounted in opposite end portions of said rotor shaft supports each having a cylindrical recess on the inner surface thereof, fifth and sixth ball bearings mounted in said last-named recesses and having a plurality of spherical balls rotatably mounted therein, a plurality of helical springs mounted in said rotor shaft mounting members and engageable with the races of said fifth and sixth ball bearings to urge same outwardly from said rotor shaft mounting members, said end portions of said rotor shaft each having a recess therein opening to the ends of said shaft and closed at the sides and inner end thereof, two balls sealingly and fixedly mounted in said recesses in said end portions of said rotor shaft, said balls in said fifth and sixth ball bearings thereby rotatably mount said rotor shaft and said rotor in said rotor case with said springs loading said fifth and sixth bearings and said rotor shaft, said balls on said rotor shaft, having a major portion thereof projecting from said rotor shaft, said gyroscope being constructed and adapted so that said rotor is rotatable by air passing through said air inlet member, said air conduit, said gimbal ring support member and said recess in said rotor case into the hollow of said rotor case to engage said recesses in said rotor and cause rotation of said rotor about said rotor shaft with said balls on said rotor shaft and said fifth and sixth bearings permitting substantially frictionless rotation of said rotor during operation.

2. A gyroscope for instruments and the like comprising, in combination, a housing having a top, a bottom, two sides and two ends defining a hollow space, an air inlet member mounted in said bottom of said housing and having a portion thereof outside said housing with another portion thereof being inside said housing, said air inlet member having an opening therein extending from the outside of said housing and intersected by a plurality of holes therethrough positioned within said housing, a first plurality of ball bearings mounted on the inner end portion of said air inlet member in an annulus, a vertical ring bearing support member mounted in said top of said housing, a second plurality of ball bearings mounted on said vertical ring bearing support in an annulus, a vertical ring positioned within said housing and having ball mounting means in opposite side portions thereof, each of said ball mounting means comprising a cylindrically shaped recess with a conical shaped inner lower surface, two spherical balls mounted in said ball mounting means of said vertical ring and positioned in contact with said first and said second plurality of ball bearings to thereby movably mount said vertical ring in said housing, each of said spherical balls having a major portion protruding from said recess and positioned in fluid sealing relation in said recess, two gimbal ring mounting members connected to said vertical ring, third and fourth pluralities of ball bearings mounted in said gimbal ring mounting members and arranged in an annulus, a generally rectangular gimbal ring positioned within said vertical ring, two gimbal ring supports mounted in said gimbal ring, each of said ring supports comprising a protruding element having a longitudinally extending cylindrically shaped recess having a conical shaped inner lower surface, two balls mounted in said gimbal ring supports and positioned to bearingly engage said third and fourth bearings, each of said balls having a major portion protruding from said cylindrically shaped recess in said gimbal ring support and positioned in fluid sealing relationship in said recess a rotor case shaped to define a generally cylindrical space therein and operatively connected to said gimbal ring support members, air supply means operatively connected to said rotor case to supply air thereto, rotor shaft mounting means operatively conected to said rotor case and positioned at the sides thereof, said rotor shaft mounting means having fifth and sixth pluralities of ball bearings mounted thereon, a rotor positioned within and subsantially filling said rotor case, a rotor shaft coaxing passing through said rotor, each end portion of said rotor shaft having a longitudinally extending cylindrically shaped recess therein opening to the ends thereof with an inner end conical shaped surface, two balls sealingly mounted in said recesses in said rotor shaft and positioned in engagement with said fifth and sixth pluralities of ball bearings to thereby rotatably mount said rotor shaft in said rotor case, a major portion of said balls on said rotor shaft projecting from said rotor shaft, said gyroscope being constructed and adapted so that air provided to said rotor case causes rotation of said rotor with the mounting of said rotor shaft permitting substantially frictionless rotation of said rotor during operation.

3. A gyroscope for instruments and the like comprising, in combination, a housing, a vertical ring pivotally mounted in said housing, a gimbal ring positioned in said housing and located within said vertical ring thereof and operatively connected to said gimbal ring and movable about an axis substantially perpendicular to the axis of movement of said vertical ring, a hollow rotor case operatively connected to said gimbal ring and positioned therein with said case having an axis substantially perpendicular to both said axis of said gimbal ring and said axis of said vertical ring, air passage means operatively connected to said rotor case to provide a fluid under pressure thereto, a rotor positioned within said rotor case and rotatable therein by gas entering said case and engaging said rotor, a rotor shaft coaxially passing through said rotor and secured thereto for rotation therewith, said rotor shaft having end portions projecting from said rotor each having a recess therein at the radially outer ends thereof, each of said recesses having a tapered bottom surface, rotor shaft mounting members operatively connected to said rotor case, two ball bearings, each of said rotor shaft mounting members having one of said ball bearings mounted therein and positioned adjacent said ends of said rotor shaft, spring means mounted in at least one of said rotor shaft mounting members engaging said bearing therein urging same toward said rotor shaft, two balls sealingly and releasably mounted in said recesses in said end portions of said rotor shaft in sealing engagement with said tapered bottom surfaces and engaging said balls in said bearings to thereby rotatably mount said rotor shaft and said rotor in said rotor case, a major portion of said balls on said rotor shaft projecting from said rotor shaft, said gyroscope being constructed and adapted so that said rotor is rotatable by a fluid entering said rotor case with said rotor and said rotor shaft being mounted to permit substantially frictionless rotation thereof during operation.

4. In a gyroscope for instruments and the like having a vertical ring and a gimbal ring positioned within and operatively connected to said vertical ring and a rotor case operatively connected to the gimbal ring and having a rotor positioned therein, the improvement comprising, in combination, a solid rotor shaft having a center portion connected to and rotatable with said rotor, the ends of said rotor shaft having axially extending recesses therein closed at the inner end with tapered bottom surfaces, two balls, each of said recesses in said rotor shaft receiving one of said balls in seated engagement with said tapered surface with a major portion of said balls projecting from said rotor shaft, seal means in said recesses engaging said balls and the walls of said recesses and sealingly and releasably mounting said balls therein, and ball bearing means operatively connected to said rotor case and having balls therein engageable with said projecting portions of said balls mounted on said rotor shaft to thereby rotatably mount said rotor shaft.

5. An instrument gyroscope comprising, in combination a housing defining a hollow space, an air inlet member mounted in said housing with a portion of said air inlet member being outside said housing and with another portion thereof being inside said housing, said air inlet member having an opening therein extending axially therethrough from the outer end thereof to an intermediate portion thereof and having at least one radially extending hole therethrough positioned within said housing and communicating with said opening, an air tube connected in one end to said outer end portion of said air inlet member and connectible to the other end to a source of air under pressure, the other end of said air inlet member having a recess therein, a first ball bearing positioned in said recess and having a plurality of spherical balls rotatably mounted therein, a ring support mounted in said housing opposite said air inlet member and having a recess in the innermost portion thereof opening into said housing and positioned in opposed relation to said air inlet member, a second ball bearing mounted in said recess in said ring support and having a plurality of spherical balls rotatably mounted therein, an open ring positioned in said housing, two elongated ball mounting members of like construction mounted in opposed relation on said ring, each of said ball mounting members having a recess in one end thereof facing outwardly from said ring, two spherical balls, each of said recesses in said ball mounting members having one of said balls mounted therein with said balls projecting therefrom and with at least one of said ball mounting members being adjustable in said ring to position said balls in contact with said spherical balls in said first and second ball bearings to thereby movably mount said ring in said housing, each of said balls having a major portion thereof projecting from said mounting members and sealed in position therein, two gimbal ring mounting members adjustably mounted in opposed relation on said ring, each of said gimbal ring mounting members having a recess therein opening toward each other, third and fourth ball bearings mounted in said recesses in said gimbal ring mounting member, each having a plurality of spherical balls rotatably mounted therein, a gimbal ring positioned within said ring normally located in a plane substantially perpendicular to the plane of said ring, two elongated gimbal ring supports adjustably mounted in opposite sides of said gimbal ring, each of said gimbal ring supports having a recess in the outer end portion thereof, two spherical balls, said last mentioned balls being sealingly mounted in said recesses in said gimbal ring supports and projecting therefrom and bearingly engaging said balls in said third and fourth bearings with a major portion of said last mentioned balls projecting from said supports, a rotor case having two spaced walls and a generally annular end wall extending between and secured to the outer end portions of said side walls to define a substantially cylindrical space in said rotor case, said end walls having two projecting abutments therein at substantially opposite positions on said case each having a recess in the outer portion thereof matingly receiving the inner end portions of said gimbal ring supports to thereby mount said rotor case on said mounting members, one of said gimbal ring supports having an axially extending hole therein extending from said inner end thereof to an intermediate portion thereof and being intersected by at least one radially extending hole from the outer surface of said support to said hole, an air conduit having an enlarged annular end portion sealingly surrounding and in fluid communication with said hole in said gimbal ring support and having the other end portion thereof positioned around and in fluid communication with said hole in said air inlet member, said rotor case having a recess extending into one of said abutments positioned in fluid communication with said hole in said inner end portion of said one of said gimbal ring supports and extending arcuately therefrom around a portion of said rotor case with the surface thereof smoothly emerging in a tangential manner with the inner surface of said end wall of said case, to pass air into said case, a rotor positioned within said rotor case having a plurality of spaced recesses therein on the radially outer surface thereof with said recesses being engageable by air or the like provided to said rotor through said air conduit, a solid rotor shaft coaxially extending through said rotor and secured thereto for rotation therewith, said rotor shaft having an elongated center portion and end portions, two rotor shaft supports secured to and projected from said opposite sides of said rotor case with said rotor shaft supports being coaxial with said rotor shaft and receiving said end portions of said rotor shaft, two rotor shaft mounting members mounted in opposite end portions of said rotor shaft supports, each having a recess in the inner surface thereof, fifth and sixth ball bearings mounted in said last mentioned recesses and having a plurality of spherical balls mounted therein, a plurality of helical springs mounted in said rotor shaft mounting members and engageable with the races of said fifth and sixth ball bearings to urge same outwardly to said rotor shaft mounting members, said end portions of said rotor shaft each having a recess therein opening to the ends of said shaft and closed at the sides and inner ends thereof, two balls sealingly and fixedly mounted in said recesses of said end portions of said rotor shaft, said balls in said fifth and sixth ball bearings to thereby rotatably mount said rotor shaft of said rotor in said rotor case with said springs loading said fifth and sixth bearings and said rotor shaft, said balls on said rotor shaft having a major portion thereof projecting from said rotor shaft, said gyroscope constructed and adapted so that said rotor is rotatable by air passing through said air inlet member, said air conduit, said gimbal ring support member and said recesses and said rotor case into the hollow of said rotor case to engage said recesses into said rotor and cause rotation of said rotor about said rotor shaft with said balls on said rotor shaft and fifth and sixth bearings permitting frictionless rotation of said rotor during operation.

References Cited by the Examiner
UNITED STATES PATENTS

| | | | |
|---|---|---|---|
| 1,851,536 | 3/1932 | Bates | 74—5.1 X |
| 2,174,777 | 10/1939 | Carter et al. | 74—5.43 |
| 2,352,469 | 6/1944 | Carlson | 74—5 X |
| 3,010,327 | 11/1961 | Fischer | 74—5.12 |

FRED C. MATTERN, Jr., *Primary Examiner.*

BROUGHTON G. DURHAM, *Examiner.*

T. W. SHEAR, J. PUFFER, *Assistant Examiners.*